United States Patent
Murai et al.

(10) Patent No.: US 9,210,620 B2
(45) Date of Patent: Dec. 8, 2015

(54) APPARATUS AND METHOD FOR DETERMINING A FORMAT OF A WIRELESS COMMUNICATION CHANNEL BASED ON A HANDOVER STATE

(71) Applicant: FUJITSU LIMITED, Kawasaki-shi, Kanagawa (JP)

(72) Inventors: Takashi Murai, Yokohama (JP); Masaru Kabashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 154 days.

(21) Appl. No.: 13/922,842

(22) Filed: Jun. 20, 2013

(65) Prior Publication Data

US 2014/0036867 A1   Feb. 6, 2014

(30) Foreign Application Priority Data

Aug. 2, 2012   (JP) ................. 2012-172341

(51) Int. Cl.
*H04W 36/00* (2009.01)
*H04W 72/04* (2009.01)
*H04W 36/30* (2009.01)

(52) U.S. Cl.
CPC ........ *H04W 36/0011* (2013.01); *H04W 72/048* (2013.01); *H04W 36/30* (2013.01)

(58) Field of Classification Search
None
See application file for complete search history.

(56) References Cited

U.S. PATENT DOCUMENTS

2011/0170496 A1* 7/2011 Fong et al. ............ 370/329
2012/0052899 A1* 3/2012 Wang et al. ........... 455/513

FOREIGN PATENT DOCUMENTS

JP   2010-130121   6/2010

* cited by examiner

*Primary Examiner* — Ian N Moore
*Assistant Examiner* — Brian T Le
(74) *Attorney, Agent, or Firm* — Myers Wolin, LLC

(57) ABSTRACT

When performing a handover of a user equipment, a base station selects one of first and second algorithms based on a handover state of the user equipment. Then, the base station determines a format of a communication channel with the user equipment based on the selected algorithm and quality of communication with the user equipment.

7 Claims, 17 Drawing Sheets

FIG. 4

| PDCCH FORMAT | NUMBER OF CCES | NUMBER OF BITS OF PDCCH |
|---|---|---|
| #0 | 1 | 72 |
| #1 | 2 | 144 |
| #2 | 4 | 288 |
| #3 | 8 | 576 |

FIG. 5A

| COMMUNICATION QUALITY | PDCCH FORMAT |
|---|---|
| $6 \leq CQI$ | #0 (CCE: 1) |
| $4 \leq CQI < 6$ | #1 (CCE: 2) |
| $2 \leq CQI < 4$ | #2 (CCE: 4) |
| $CQI < 2$ | #3 (CCE: 8) |

FIG. 5B

| COMMUNICATION QUALITY | PDCCH FORMAT |
|---|---|
| $15 \leq CQI$ | #0 (CCE: 1) |
| $14 \leq CQI < 15$ | #1 (CCE: 2) |
| $2 \leq CQI < 14$ | #2 (CCE: 4) |
| $CQI < 2$ | #3 (CCE: 8) |

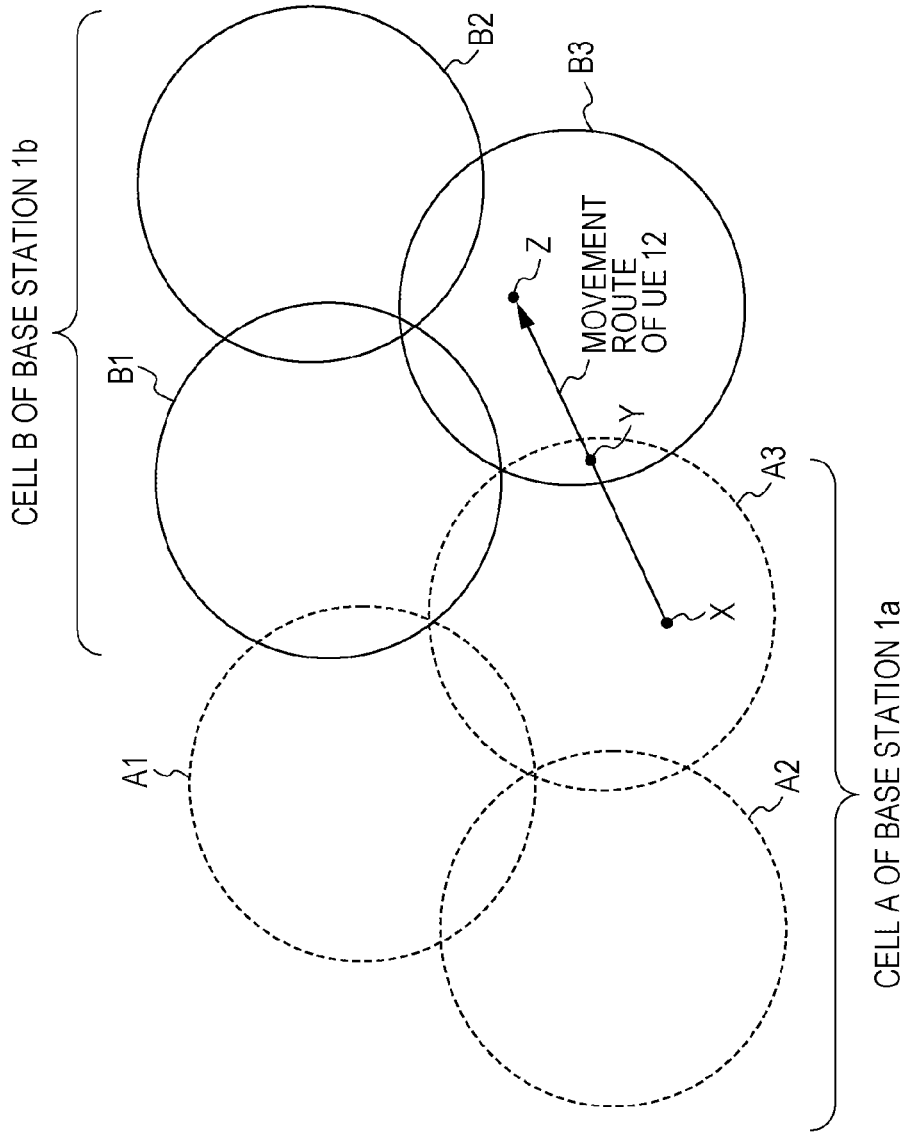

FIG. 16A

| USER EQUIPMENT | ALGORITHM |
|---|---|
| UE1 | 1 |
| UE2 | 1 |
| UE3 | 2 |
| UE4 | 1 |
| ⋮ | ⋮ |

FIG. 16B

| USER EQUIPMENT | CQI |
|---|---|
| UE1 | 10 |
| UE2 | 11 |
| UE3 | 13 |
| UE4 | 12 |
| ⋮ | ⋮ |

APPARATUS AND METHOD FOR DETERMINING A FORMAT OF A WIRELESS COMMUNICATION CHANNEL BASED ON A HANDOVER STATE

CROSS-REFERENCE TO RELATED APPLICATION

This application is based upon and claims the benefit of priority from the prior Japanese Patent Application No. 2012-172341, filed on Aug. 2, 2012, the entire contents of which are incorporated herein by reference.

FIELD

The embodiments discussed herein are related to apparatus and method for determining a format of a wireless communication channel based on a handover state.

BACKGROUND

In a wireless communication system, a control signal is transmitted from a base station to a user equipment, and the user equipment controls communication in accordance with the control signal. For example, in the 3rd Generation Partnership Project (3GPP), a physical downlink control channel (PDCCH) is defined as a communications channel for transmitting a control signal from a base station to a user equipment.

The PDCCH allows each control signal to be transmitted to a corresponding one of a plurality of user equipments. That is, the resources of the PDCCH are allocated to a plurality of user equipments. Here, a base station allocates one or more control channel elements (CCEs) as the resources of the PDCCH to each user equipment.

Based on a channel quality indicator (CQI) notified from a user equipment, a base station determines the number of CCEs to be allocated to the user equipment. That is, based on a channel quality indicator (CQI) notified from a user equipment, a base station determines the PDCCH format corresponding to the user equipment. The CQI is an index indicating the quality of communication between a base station and a user equipment, and is measured in each user equipment.

A base station determines the PDCCH format (that is, the number of CCEs) corresponding to each user equipment, based on the below relationships. Note that characters a, b, and c in the below relationships each represent communication quality. Communication quality of a is better than communication quality of b, and the communication quality of b is better than communication quality of c. The relationships between conditional expressions for the CQI and the PDCCH formats are as follows: a≤CQI: PDCCH format #0 (one CCE), b≤CQI<a: PDCCH format #1 (two CCEs), c≤CQI<b: PDCCH format #2 (four CCEs), and CQI<c: PDCCH format #3 (eight CCEs).

For example, when the communication quality between a base station and a user equipment (that is, the CQI measured by the user equipment) s higher than "a", format #0 that uses only one CCE is selected. When the communication quality between a base station and a user equipment is lower than "c", format #3 that uses eight CCEs is selected.

As such, when the communication quality between a base station and a user equipment is good, the base station selects a PDCCH format using a small number of CCEs. Here, when the communication quality is good, a signal may be transmitted using a modulation scheme in which the amount of information per symbol is large. Consequently, in this case, a control signal is transmitted with a few resources.

In contrast to this, when the communication quality between a base station and a user equipment is not good, the base station selects a PDCCH format using a large number of CCEs. Here, when the communication quality is poor, it is preferable, in order to constrain transmission errors, that a modulation scheme in which the amount of information per symbol is small is used. Accordingly, in this case, since a control signal is transmitted at a low transmission rate, the format that uses many resources is selected.

In order to increase the number of user equipments that are allowed to be located in the coverage area of a base station, it is preferable that the resources of the PDCCH allocated to each user equipment are decreased. When the resources of PDCCH allocated to each user equipment are excessively few, however, the error rate of control signals transmitted via the PDCCH is degraded, and may, in some cases, lead to disconnection of communication between the base station and the user equipment. Thus, in a wireless communication system that determines a PDCCH format based on communication quality between a base station and a user equipment (that is, a CQI measured by the user equipment), it is preferable that thresholds (that is, the above mentioned characters a, b, and c) for selecting a PDCCH format are determined in consideration of both of efficient utilization of radio resources and constraint on transmission errors. Then, in one embodiment, the thresholds for selecting a PDCCH format are determined based on measurements or a simulation at the time of construction of a wireless communication system, for example.

Note that a reception format decoding method mentioned hereinafter has been proposed as a related art technique. In this method, a frame is transmitted from a base station to a user equipment in a frame format selected from a plurality of types in accordance with the propagation path between the base station and the user equipment. When decoding the frame, the user equipment determines the order of decoding of frame formats in accordance with the state of the propagation path environment (see, Japanese Laid-open Patent Publication No. 2010-130121).

SUMMARY

According to an aspect of the invention, when performing a handover of a user equipment, a base station selects one of first and second algorithms, based on a handover state of the user equipment. Then, the base station determines a format of a communication channel with the user equipment based on the selected algorithm and quality of communication with the user equipment.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of physical downlink control channel (PDCCH) formats;

FIGS. 5A and 5B are diagrams each illustrating an example of a format determination table, according to an embodiment;

FIG. 6 is a diagram illustrating an example of a layout of cells provided by base stations;

FIG. 16A is a diagram illustrating an example of an algorithm management table, according to an embodiment;

FIG. 16B is a diagram illustrating an example of a CQI management table, according to an embodiment.

DESCRIPTION OF EMBODIMENTS

As described above, the PDCCH format is determined based on the communication quality between a base station and a user equipment. However, in some communication environments, although communication quality is good, the transmission error rate of signals transmitted between a base station and a user equipment is degraded. For example, such a problem arises when the degree of influence of interference varies between reception signals at the time of measurement of communication quality (for example, a reference symbol on a reception signal) and transmission using a PDCCH format selected based on communication quality. Therefore, even in the case where the result of measurement of communication quality is that the electrical power of the reception signal is sufficiently large, the transmission error rate is sometimes degraded because of the influence of interference and so on.

Such a phenomenon may arise in the case where base stations are arranged in such a manner that the distance between them is short, for example. For example, in the case where base stations are arranged at a narrow interval, there is a possibility that, in a situation where the electrical power of a reception signal from one base station is sufficiently large, a handover to the other base station occurs. During a handover, the transmission error rate tends to be degraded because of the influence of interference and so on. However, when the result of measurement of communication quality is that the electrical power of the reception signal is sufficiently large, a PDCCH format that uses a small number of CCEs is selected based on the measured communication quality. If the PDCCH format is selected based on the reception power in such a way, transmission errors may increase, leading to disconnection of communication.

This problem is solvable if sufficiently large values are set in advance as threshold (that is, the aforementioned characters a, b, and c) for selecting a PDCCH format, for example. With this method, however, more PDCCH resources than used are allocated to each user equipment. As a result, the utilization efficiency of resources will decrease and the number of user equipments that may be located within the coverage area of a base station will also decrease.

Note that this problem does not arise solely in the PDCCH and may arise similarly in other communication channels.

Figure 1:
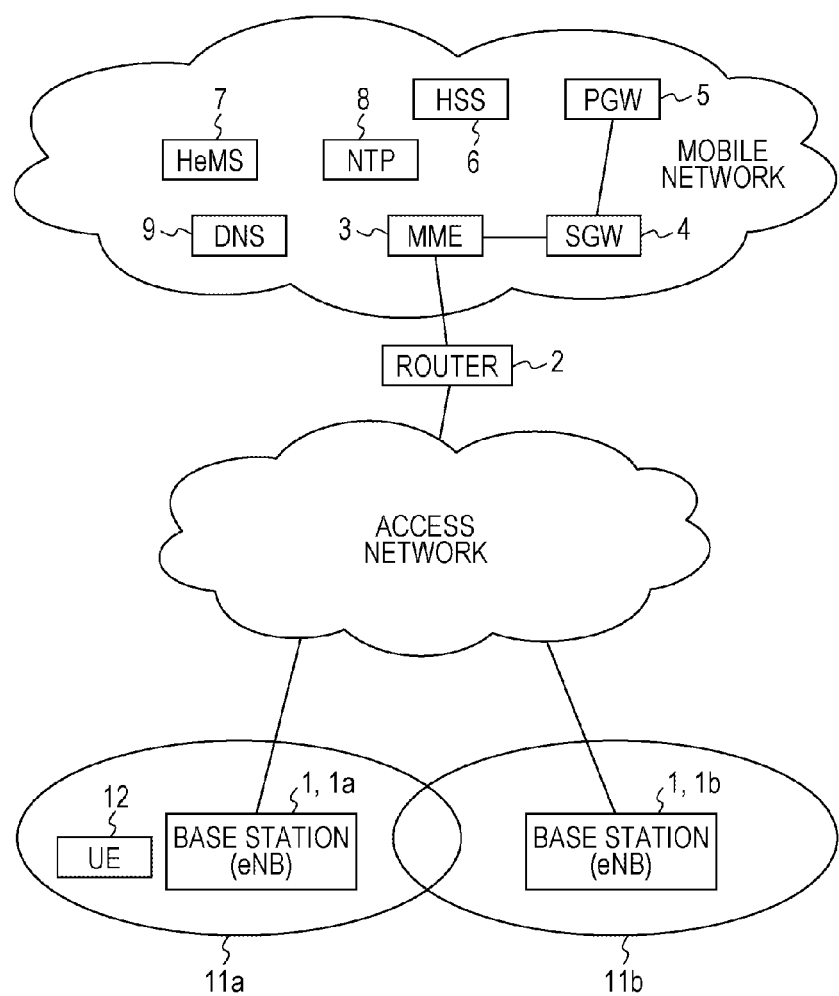
FIG. 1 is a diagram illustrating a configuration example of a wireless communication system, according to an embodiment.

FIG. 1 is a diagram illustrating a configuration example of a wireless communication system, according to an embodiment. FIG. 1 illustrates a system in which a base station device of an embodiment of the present disclosure is used. The wireless communication system includes base stations 1 (1a and 1b), a router 2, a mobility management entity (MME) 3, a serving gateway (SGW) 4, a packet data network gateway (PGW) 5, home subscriber server (HSS) 6, a base station management server (HeMS) 7, a network time protocol (NTP) server 8, and a domain name system (DNS) server 9.

The base station 1 is implemented by using an evolved Node B (eNodeB or eNB) in this example. An eNodeB is capable of providing wireless protocol functions such as media access control (MAC) and radio resource control (RRC) in addition to functions of transmitting and receiving radio signals.

Each base station 1 provides a cell (wireless communication coverage area). In FIG. 1, the base stations 1a and 1b provide cells 11a and 11b, respectively. Thus, the base station 1 is able to transmit and receive radio signals to and from a user equipment (UE) 12 located in the cell that the base station 1 provides. In the example illustrated in FIG. 1, the user equipment 12 is located in the cell 11a and therefore is able to transmit and receive radio signals to and from the base station 1a. When moving into the cell 11b, the user equipment 12 is able to transmit and receive radio signals to and from the base stations 1b. Note that when the user equipment 12 moves from one cell to another cell, a handover is performed. For example, when moving from the cell 11a to the cell 11b, the user equipment 12 shifts from a state where the user equipment 12 is located within the coverage area of the base station 1a to a state where the user equipment 12 is located within the coverage area of the base station 1b, while continuously maintaining communication.

The router 2 transfers an Internet protocol (IP) packet in accordance with the destination information of the IP packet. Note that, in the embodiment illustrated in FIG. 1, each base station 1 is connected over an access network to the router 2. The mobility management entity 3 manages the movement of the user equipment 12. The mobility management entity 3 may also manage sessions of the user equipment 12. The serving gateway 4 transfers communication data. Note that the serving gateway 4 sometimes serves as a data communication anchor point when a handover of the user equipment 12 is performed. The packet data network gateway 5 is capable of connecting a mobile network and another network. The home subscriber server 6 manages the subscriber information, authentication information, position information, and the like of the user equipment 12. The base station management server 7 performs management and operations of the base stations 1. The NTP server 8 synchronizes the times of all the devices in the network. The DNS server 9 manages the correspondence between the domain name and the IP address.

In this embodiment, the mobility management entity 3, the home subscriber server 6, the base station management server 7, the NTP server 8, and the DNS server 9 are connected to the router 2. Note that the configuration and functions of the mobile network are described in the 3rd Generation Partnership Project (3GPP) 23.401, for example.

Figure 2:
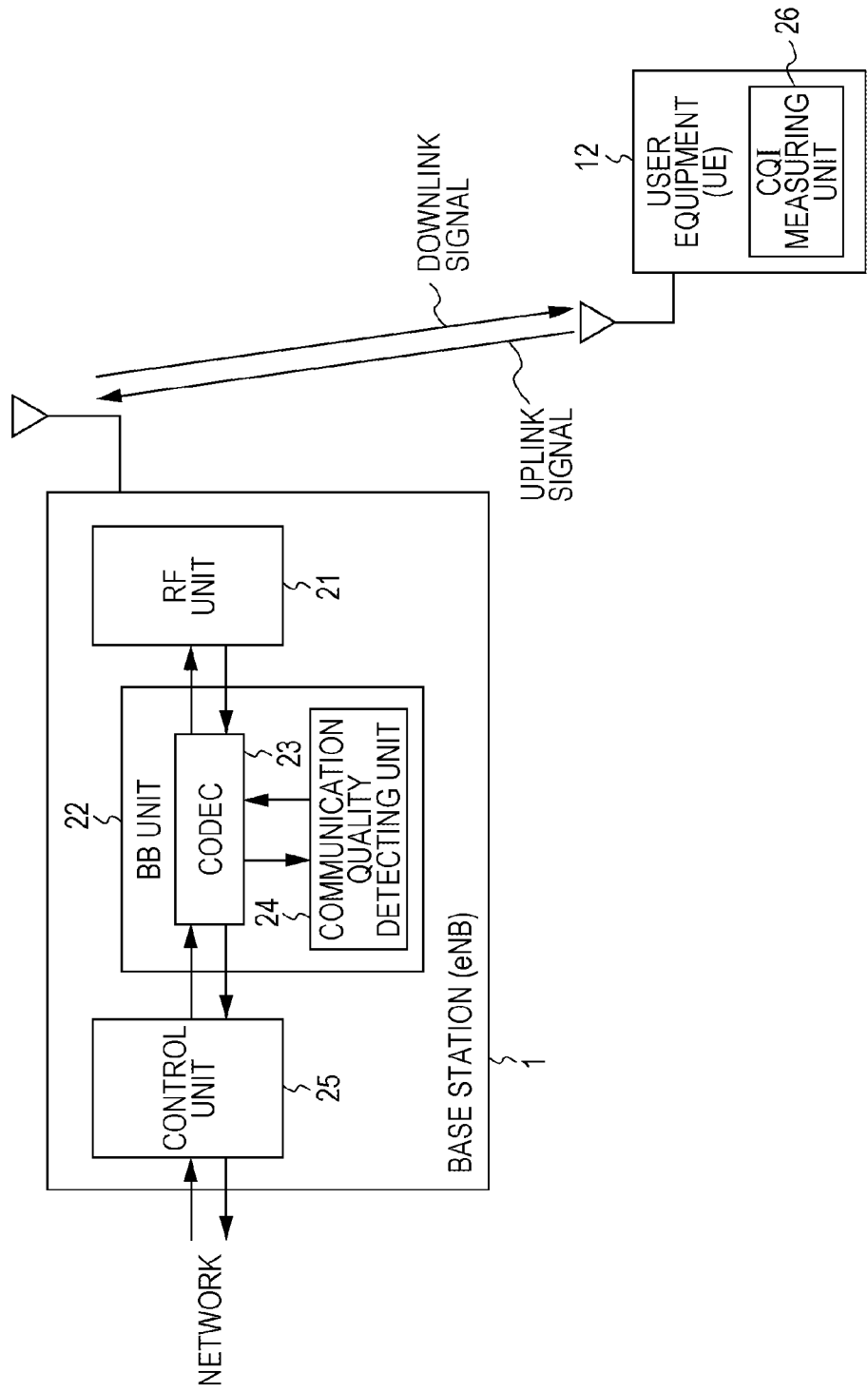
FIG. 2 is a diagram illustrating an example of communication between a base station and a user equipment.

FIG. 2 is a diagram illustrating an example of communication between a base station and a user equipment. In FIG. 2, it is assumed that the user equipment 12 is located in the cell that the base station 1 provides. That is, the user equipment 12 is allowed to receive a downlink signal transmitted from the base station 1. The base station 1 is also allowed to receive an uplink signal transmitted from the user equipment 12.

The base station 1 includes a control unit 25, a baseband unit 22, and a radio frequency (RF) unit 21. The control unit 25 provides an interface for connection to a network. The baseband unit 22 processes signals in a baseband region. Here, a codec 23 performs encoding and decoding. A communication quality detecting unit 24 detects the quality of communication between the base station 1 and the user equipment 12. The RF unit 21 processes signals in a radio frequency (RF) region. Note that the configuration and operations of the base station 1 will be described in detail later.

The user equipment 12 includes a channel quality indicator (CQI) measuring unit 26. Utilizing a downlink signal transmitted from the base station 1, the CQI measuring unit 26 measures the quality of communication between the base station 1 and the user equipment 12, and calculates a CQI indicating the result of measurement. Here, the CQI is calculated based on electric power of downlink signals, for example. The CQI takes on values from 0 to 15 for indicating communication quality in this example. "CQI=15" indicates the best quality and "CQI=0" indicates the worst quality. Then, the CQI measuring unit 26 creates a CQI report for notifying the base station 1 of the CQI, and transmits the CQI report to the base station 1. Note that a CQI report is periodically, for example, transmitted from the user equipment 12 to the base station 1. The CQI measured by the CQI measuring unit 26 is, but not particularly limited to, a wideband-CQI, for example.

In the base station 1, the communication quality detecting unit 24 detects the quality of communication between the base station 1 and the user equipment 12 based on the CQI report received from the user equipment 12. Then, the base station 1 determines the format of a communication channel between the base station 1 and the user equipment 12 based on the detected communication quality. As will be described in detail later, in this embodiment, the format of a physical downlink control channel (PDCCH) for transmitting a control signal from the base station 1 to the user equipment 12 is determined based on the CQI indicating the quality of communication between the base station 1 and the user equipment 12.

Figure 3:
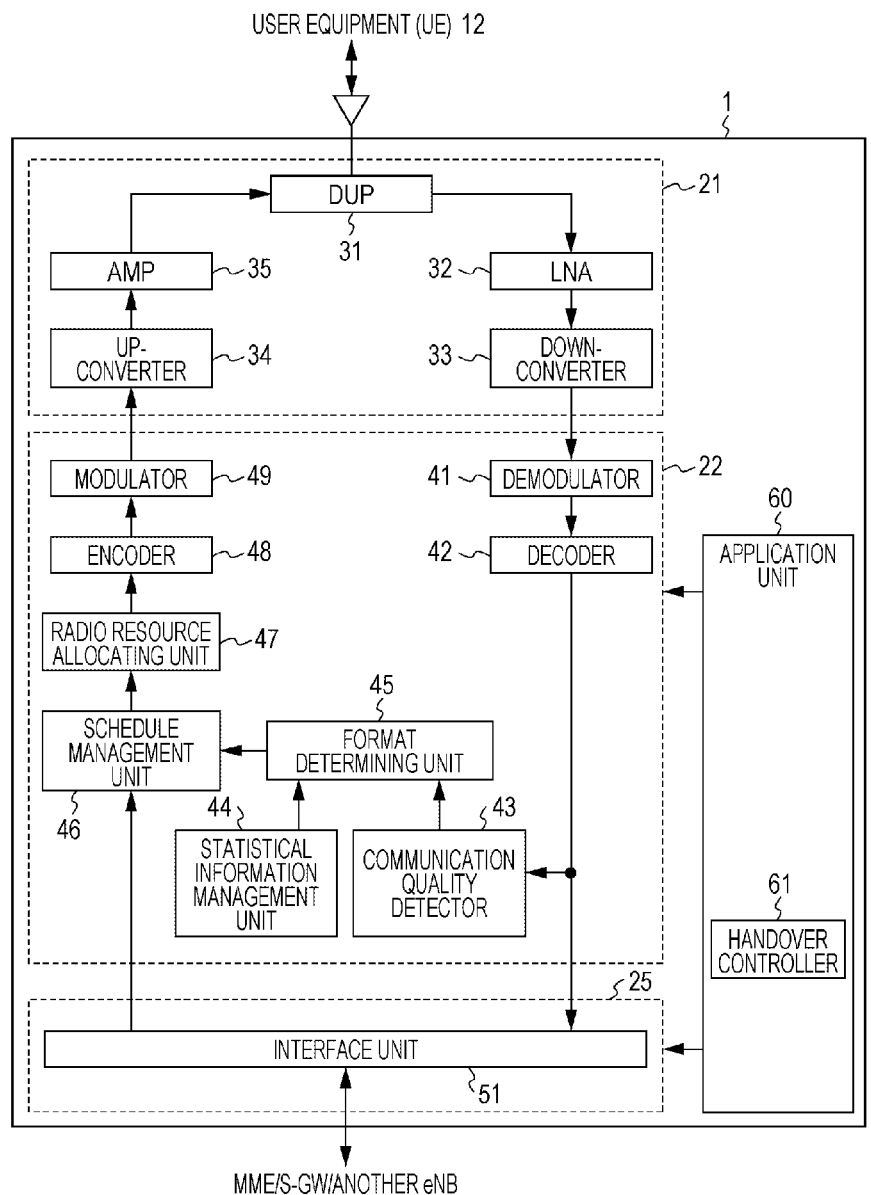
FIG. 3 is a diagram illustrating a configuration example of a base station, according to an embodiment.

FIG. 3 is a diagram illustrating a configuration example of a base station, according to an embodiment. The base station 1 includes the RF unit 21, the baseband unit 22, the control unit 25, and an application unit 60, as illustrated in FIG. 3.

The RF unit 21 includes a duplexer (DUP) 31, a low noise amplifier (LNA) 32, a down-converter 33, an up-converter 34, and a transmission amplifier (AMP) 35. The duplexer 31 leads a signal received by an antenna (a reception signal) to the low noise amplifier 32. The duplexer 31 also leads a signal output from the transmission amplifier 35 to the antenna. The low noise amplifier 32 amplifies the reception signal. The down-converter 33 down-converts the reception signal amplified by the low noise amplifier 32, from the RF band to the base band. The up-converter 34 up-converts a transmission signal output from the baseband unit 22, from the baseband to the RF band. The transmission amplifier 35 amplifies the transmission signal output from the up-converter 34. Note that the RF unit 21 is implemented by hardware circuitry, for example.

The baseband unit 22 includes a demodulator 41, decoder 42, a communication quality detector 43, a statistical information management unit 44, a format determining unit 45, a schedule management unit 46, a radio resource allocating unit 47, an encoder 48, and a modulator 49.

The demodulator 41 demodulates a reception signal. The decoder 42 decodes the reception signal demodulated by the demodulator 41. Thereby, data transmitted from the user equipment 12 is reproduced. Then, the reproduced data is led to the control unit 25.

The communication quality detector 43 extracts a CQI from the reproduced data obtained by the decoder 42. As described with reference to FIG. 2, the CQI indicates the quality of communication between the base station 1 and the user equipment 12, and is measured by the user equipment 12. Note that the CQI is an example of information indicating communication quality. As will be described in detail later, the statistical information management unit 44 manages information indicating a handover success rate for each user equipment.

The format determining unit 45 determines the format of a communications channel corresponding to the user equipment 12. Here, when the base station 1 has a coverage area within which a plurality of user equipments are located, the format determining unit 45 determines the formats of communication channels that are respectively corresponding to user equipments. Also, in this embodiment, the format determining unit 45 determines the PDCCH format corresponding to each user equipment.

Note that the wireless communication system of the embodiment provides four formats #0 to #3 illustrated in FIG. 4 as PDCCH formats. The number of control channel elements (CCEs) included in formats #0, #1, #2, and #3 are 1, 2, 4, and 8, respectively. The CCE is a resource for transmitting a control signal from the base station 1 to a user equipment, and the PDCCH transmits a control signal to each user equipment using one or more CCEs. Here, the number of bits of one CCE is 72.

For the case where a control signal is transmitted in a PDCCH format in which a few resources are used, a modulation scheme with which the amount of information per symbol is large is employed, for example. For this reason, a PDCCH format in which a few resources are used is preferably used in the environment where communication quality is good. In contrast to this, for the case where a control signal is transmitted in a PDCCH format in which many resources are used, a modulation scheme with which the amount of information per symbol is small is employed, for example. For this reason, a PDCCH format in which many resources are used may be used in the environment where communication quality is poor. Accordingly, the format determining unit 45 determines the PDCCH format based on the communication quality (that is, CQI) between the base station 1 and the user equipment 12.

The format determining unit 45 determines the format of a communication channel between the base station 1 and the user equipment 12 based on the communication quality detected by the communication quality detector 43, by using a first algorithm or second algorithm. That is, the format determining unit 45 determines the PDCCH format for transmitting a control signal from the base station 1 to the user equipment 12, based on the CQI, by using the first algorithm or second algorithm.

Referring to format determination table A illustrated in FIG. 5A, the first algorithm determines a PDCCH format. In format determination table A, the correspondences between the conditional expressions for the CQI and the PDCCH formats are recorded. In accordance with format determination table A illustrated in FIG. 5A, when "6≤=CQI", PDCCH format #0 will be selected. When "4<=CQI<6", PDCCH format #1 will be selected. When "2≤CQI<4", PDCCH format #2 will be selected. When "CQI<2", PDCCH format #3 will be selected.

In this way, "6", "4", and "2" used in format determination table A are thresholds for determining the PDCCH format corresponding to the detected CQI. That is, the first algorithm determines the PDCCH format corresponding to the user equipment 12 by comparing the detected CQI with the thresholds "6", "4", and "2".

Referring to format determination table B illustrated in FIG. 5B, the second algorithm determines the PDCCH format. Also, in format determination table B, the correspondences between the conditional expressions for the CQI and the PDCCH formats are recorded. However, format determination table A and format determination table B differ from each other in the conditional expressions for the CQI. That is, in accordance with format determination table B illustrated in FIG. 5B, when "15=CQI", PDCCH format #0 will be selected. When "14≤CQI<15", PDCCH format #1 will be selected. When "2≤CQI<14", PDCCH format #2 will be selected. Then, when "CQI<2", PDCCH format #3 will be selected.

In this way, "15", "14", and "2" used in format determination table B are thresholds for determining the PDCCH format corresponding to the detected CQI. That is, the second algorithm determines the PDCCH format corresponding to the user equipment 12 by comparing the detected CQI with the thresholds "15", "14", and "2".

Note that the thresholds "6", "4", and "2" used in the first algorithm and the thresholds "15", "14", and "2" used in the second algorithm are only exemplary. That is, the present disclosure is not intended to be limited to these values. However, the thresholds used in the second algorithm are larger than the corresponding thresholds used in the first algorithm, respectively. Here, in the case where a plurality of thresholds are used in each algorithm, some of the plurality of thresholds used in the second algorithm may be the same as the corresponding thresholds used in the first algorithm.

In this way, the thresholds used in order to make a determination of the PDCCH format in the second algorithm are larger than the corresponding thresholds in the first algorithm. That is, the threshold for determining whether to select PDCCH #0 is "6" in the first algorithm, whereas this threshold is "15" in the second algorithm. The threshold for determining whether to select PDCCH #1 or PDCCH #2 is "4" in the first algorithm, whereas this threshold is "14" in the second algorithm. However, the threshold for selecting PDCCH #2 or PDCCH #3 is "2" in the first and second algorithms.

Accordingly, in the second algorithm, the PDCCH format that uses many resources is more likely to be selected than in the first algorithm. For example, it is assumed that "CQI=10" is obtained. In this case, format #0 that uses one CCE is selected in accordance with the first algorithm, whereas format #2 that uses four CCEs is selected in accordance with the second algorithm.

For every user equipment, the format determining unit 45 selects one of the first algorithm and the second algorithm to determine the PDCCH format. In this embodiment, the format determining unit 45 selects and executes one of the first algorithm and the second algorithm, based on the handover state of each user equipment. Note that a method for selecting one of the first algorithm and the second algorithm will be described later.

Note that, an "algorithm" may be executed by a computer, processor, or the like and may be caused to be performed in hardware circuitry. Alternatively, an "algorithm" may be executed in a combination of hardware and software.

The schedule management unit 46 manages timings at which data signals are transmitted to user equipments located within the coverage area of the base station 1. The schedule management section 46 also controls the PDCCH based on the format determined for each user equipment by the format determining unit 45. The radio resource allocating unit 47 allocates radio resources (spreading codes, for example) to all the user equipments located within the coverage area of the base station 1.

The encoder 48 encodes a transmission signal. Then, the modulator 49 modulates the encoded transmission signal. The modulation signal generated by the modulator 49 is delivered to the RF unit 21.

The baseband unit 22 is implemented by using a processor, a memory, and hardware circuitry, for example, although the present disclosure is not particularly limited to this. In this case, the format determining unit 45 may be implemented by using hardware circuitry and may also be implement by using software. The tables illustrated in FIG. 5A and FIG. 5B are stored in a memory.

The control unit 25 includes an interface unit 51 for connection with a network. The interface unit 51 is capable of transmitting a signal to the mobility management entity (MME), the serving gateway (SGW), or another base station (eNB) illustrated in FIG. 1. The interface unit 51 is capable of receiving a signal from the mobility management entity (MME), the serving gateway (SGW), or another base station (eNB).

The application unit 60 is implemented by using a processor and a memory, and provides functions described as software programs. The application unit 60 includes a handover controller 61. The handover controller 61 controls handovers of user equipments that are located within a coverage area of the base station 1. The procedure of a handover will be described in detail later.

Figure 7:
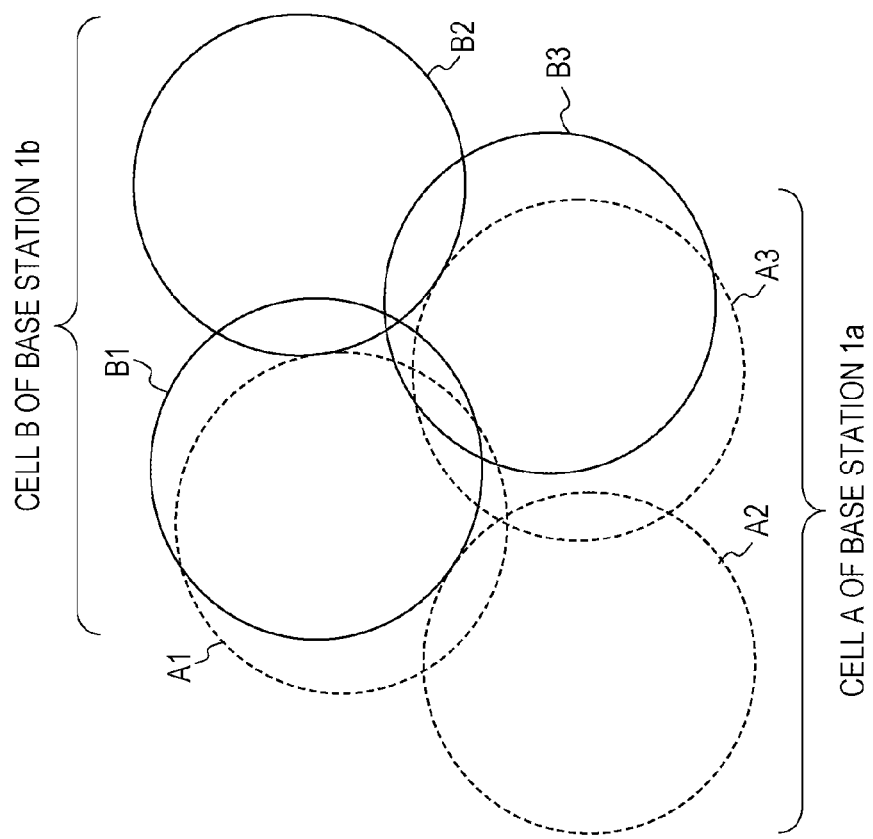
FIG. 7 is a diagram illustrating an example of a layout of cells provided by base stations.

FIG. 6 and FIG. 7 are diagrams each illustrating a layout of cells provided by base stations. In the examples illustrated in FIG. 6 and FIG. 7, the layouts of cells provided by two base stations (1*a* and 1*b*) neighboring each other are illustrated. The cell provided by each base station is formed of three sectors. That is, cell A provided by the base station 1*a* is formed of sectors A1 to A3. Each of sectors A1 to A3 is represented by a broken-line circle. Cell B provided by the base station 1*b* is formed of sectors B1 to B3. Each of sectors B1 to B3 is represented by a solid line.

In FIG. 6, it is assumed that the user equipment (UE) 12 moves from point X through point Y to point Z. When located at point X, the user equipment 12 communicates via the base station 1*a*. Then, when passing through point Y, the user equipment 12 is handed over from the base station 1*a* to the base station 1*b*. Thereafter, when the user equipment 12 is located at point Z, the user equipment 12 communicates via the base station 1*b*.

Note that a base station having a coverage area within which the user equipment 12 has been located before a handover is performed is sometimes referred to as a "serving base station (S-eNB)". Also, a base station having a coverage area within which the user equipment 12 is located after a handover is performed is sometimes referred to as a "target base station (T-eNB)". In the examples illustrated in FIG. 6 and FIG. 7, the base station 1a is a serving base station, and the base station 1b is a target base station.

By the way, base stations are arranged at narrow intervals in a high-density populated area or business district. When base stations are arranged at narrow intervals, the overlapping area between cells (or sectors) neighboring each other becomes large. For example, in the example illustrated in FIG. 7, sector A3 and sector B3 overlap to a great extent.

Figure 8:
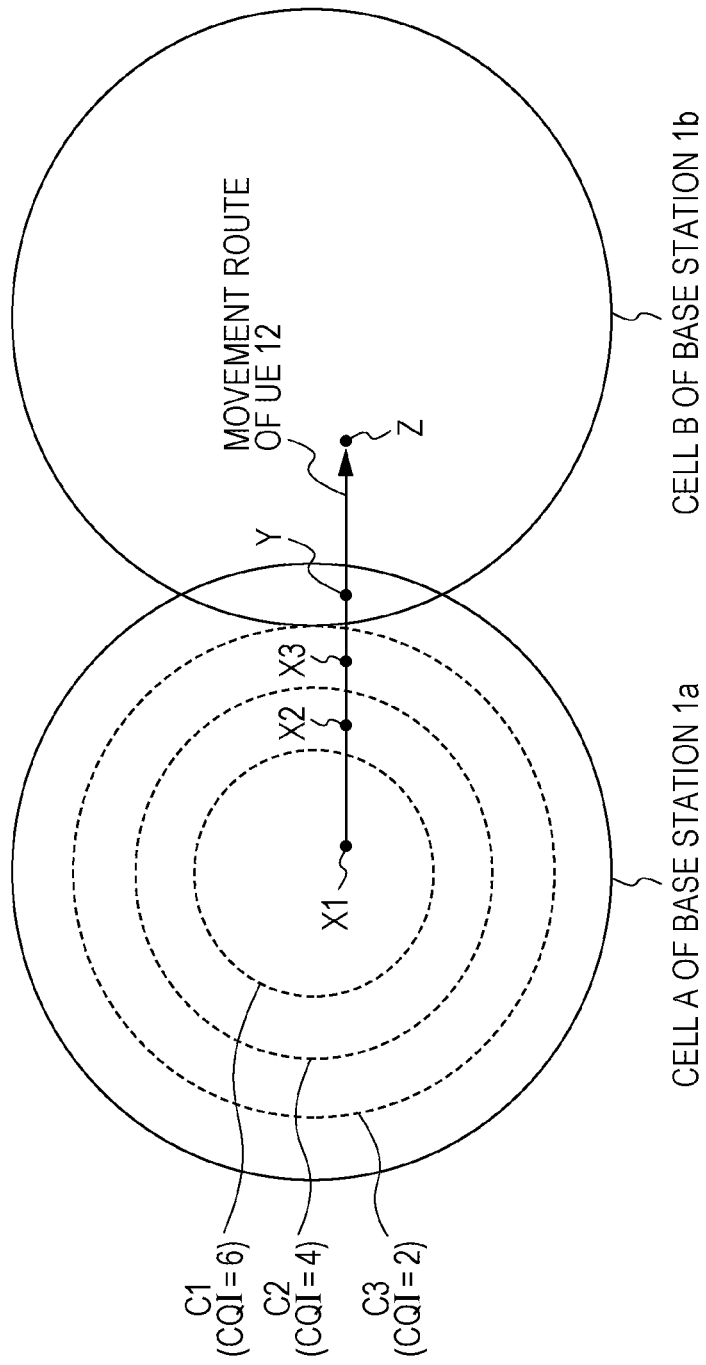
FIG. 8 is a diagram illustrating an example of operations during a handover.
Figure 9:
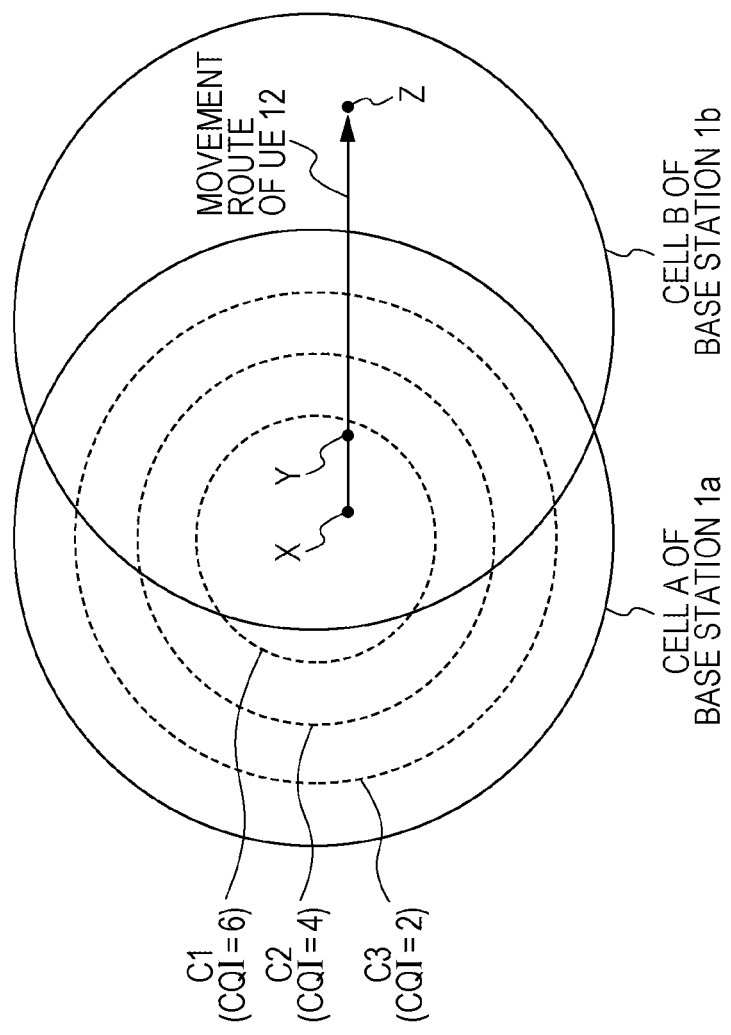
FIG. 9 is a diagram illustrating an example of operations during a handover.

However, when there is a large overlapping area between cells (or sectors) neighboring each other, a communication failure may occur during a handover. With reference to FIG. 8 and FIG. 9, a failure during a handover will now be described.

In FIG. 8 and FIG. 9, two cells A and B neighbor each other. The CQI obtained by the user equipment (UE) 12 located within a cell is dependent on the distance of the user equipment (UE) 12 from the base station 1. Here, for the sake of simplicity of description, it is assumed that the base station 1 has no directivity. Note that three broken-line circles C1, C2, and C3 indicate locations where "CQI=6", "CQI=4", and "CQI=2" are obtained, respectively. That is, in the area inside of circle C1, the CQI is larger than "6". In the area between circle C1 and circle C2, the CQI is in a range from "4 to 6". In the area between circle C2 and circle C3, the CQI is in a range from "2 to 4". In the area outside of circle C3, the CQI is smaller than "2". Note that it is assumed that the format determining unit 45 determines the PDCCH format using the table illustrated in FIG. 5A.

In FIG. 8, it is assumed that the user equipment (UE) 12 moves from point X1 sequentially through points X2, X3, and Y to point Z. When the user equipment 12 is located at a place from point X1 to point X3, the user equipment 12 communicates via the base station 1a. However, when the user equipment 12 is located at point X1, the CQI obtained by the user equipment 12 is larger than "6", and therefore the format determining unit 45 selects PDCCH format #0. Also, when the user equipment 12 is located at point X2, "4<CQI<6", and therefore the format determining unit 45 selects PDCCH format #1. Additionally, when the user equipment 12 is located at point X3, "2<CQI<4", and therefore the format determining unit 45 selects PDCCH format #2.

When the user equipment 12 passes through point Y, the user equipment 12 is handed over from the base station 1a to the base station 1b. At this point, the user equipment 12 is located near the edge of cell A (that is, outside of circle C3), and the CQI obtained by the user equipment 12 is smaller than "2", and therefore the format determining unit 45 selects PDCCH format #3. In PDCCH format #3, signals are transmitted by using many resources. This constrains transmission errors.

When an handover is performed, interference between radio waves received from the serving base station and radio waves received from the target base station increases in the user equipment 12. For this reason, when the user equipment 12 passes through point Y in FIG. 8 (that is, at the time when a handover is performed), transmission errors are likely to occur under the influence of interference. However, as mentioned above, PDCCH format #3 is selected when the user equipment 12 passes through point Y. This constrains transmission errors of the PDCCH. Accordingly, even during a handover, which enhances the influence of interference, the user equipment 12 may continue communication.

In contrast to this, in the example illustrated in FIG. 9, cells A and B neighboring each other overlap to a great extent. In this case, during movement of the user equipment 12 from point X to point Z, a handover is performed before the user equipment 12 reaches the edge of cell A. In the example illustrated in FIG. 9, when the user equipment 12 passes through point Y, a handover is performed. That is, in the case where cells A and B neighboring each other overlap to a great extent, a handover will be performed before radio waves from the serving base station (the base station 1a here) become weak.

When the user equipment 12 is located at point X, the user equipment 12 communicates via the base station 1a. When the user equipment 12 is located at point X, the CQI obtained by the user equipment 12 is larger than "6", and therefore the format determining unit 45 selects PDCCH format #0.

Subsequently, when the user equipment 12 passes through point Y, the user equipment 12 is handed over from the base station 1a to the base station 1b. In the example illustrated in FIG. 9, which is unlike the above example of FIG. 8, at the time when a handover is performed, the user equipment 12 is located at a point relatively near the center of cell A (that is, inside of circle C3). For this reason, since the CQI obtained by the user equipment 12 is larger than "6" when a handover is performed, the format determining unit 45 selects PDCCH format #0.

In PDCCH format #0, signals are transmitted by using a few resources, and therefore transmission errors are more likely to occur than in PDCCH formats #1 to #3. In addition, as mentioned above, when a handover is performed, transmission errors are likely to occur under the influence of interference. That is, in the example illustrated in FIG. 9, a control signal is transmitted in PDCCH format #0, in which transmission errors are likely to occur, in the environment where transmission errors are likely to occur (that is, in the environment where a handover is performed). Therefore, in this case, the user equipment 12 is sometimes not able to receive a PDCCH control signal when the user equipment 12 passes through point Y. That is, in a wireless communication system in which base stations are arranged at narrow intervals, when a handover is performed, a communication failure may occur between a base station and the user equipment.

To address this, the base station 1 of the embodiment selects one of the first algorithm and second algorithm mentioned above, based on the state of a handover of the user equipment 12. Then, the base station 1 determines a PDCCH format corresponding to the user equipment 12 by using the selected algorithm.

Figure 10:
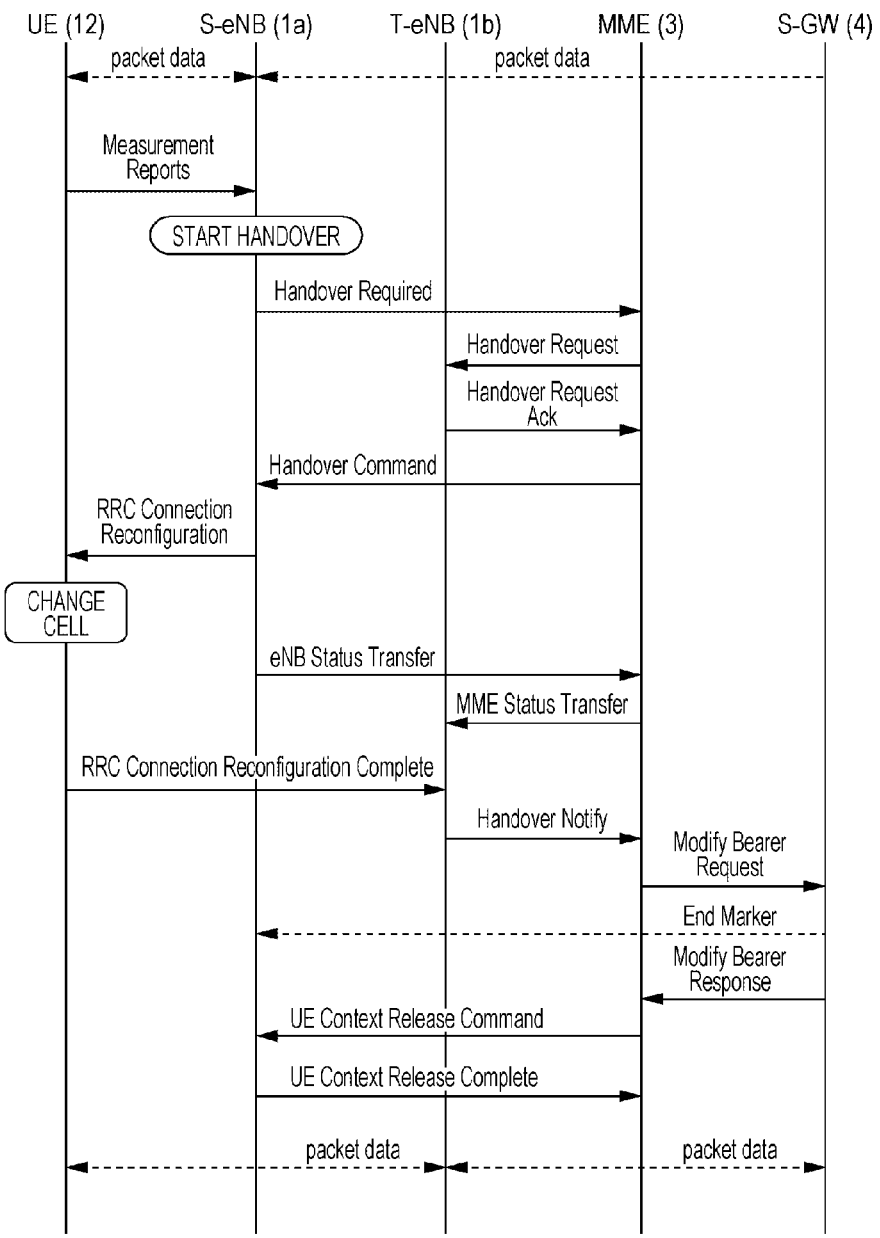
FIG. 10 is a diagram illustrating an example of a handover sequence.

FIG. 10 is a diagram illustrating an example of a handover sequence. The handover illustrated in FIG. 10 is an S1 handover in a LTE network.

The user equipment 12 (hereinafter referred to as the UE) is located within the cell of the serving base station (hereinafter referred to as the S-eBN). That is, the UE transmits and receives packet data through the S-eNB. Then, it is assumed that the UE moves toward the cell of the target base station (hereinafter referred to as the T-eNB). At this time, the UE periodically measures communication quality between the S-eNB and the UE, and notifies the S-eNB of CQI reports on the measurement results.

The UE measures the intensity of radio waves transmitted from the S-eNB and the intensity of radio waves transmitted from the T-eNB, for example. Then, when these two measurement values satisfies given conditions, the UE creates Measurement Report and transmits this Measurement Report to the S-eNB. Measurement Report is an example of a signal requesting a handover from a user equipment to a base station.

Upon receipt of Measurement Report, the S-eNB starts handover operations. That is, the S-eNB transmits Handover Required to a mobility management entity (hereinafter referred to as an MME). Handover Required includes information identifying the UE that has transmitted Measurement Report, information identifying the S-eNB, and information identifying T-eNB, for example.

Upon receipt of Handover Required, the MME transmits Handover Request to the T-eNB. This Handover Request is an example of a signal requesting a handover from an MME to a base station.

Upon receipt of Handover Request, the T-eNB returns Handover Request Ack to the MME. Then, upon receipt of Handover Request Ack, the MME transmits Handover Command to the S-eNB.

Upon receipt of Handover Command, the S-eNB transmits RRC Connection Reconfiguration to the UE that has issued Measurement Report. Thereby, the UE changes the base station for connection. That is, the UE is separated from the cell provided by the S-eNB and is synchronized with the cell provided by the T-eNB.

Thereafter, the S-eNB transmits eNB Status Transfer to the MME. Then, the MME transmits MME Status Transfer to the T-eNB. Additionally, the UE transmits RRC Connection Reconfiguration Complete to the T-eNB. From this, the T-eNB recognizes that a change from the S-eNB to the T-eNB has been completed in the UE. Then, the T-eNB transmits Handover Notify to the MME.

The MME transmits Modify Bearer Request to a serving gateway (hereinafter referred to as an S-GW). Then, the S-GW returns Modify Bearer Response to the MME. At this time, the S-GW may transmit End Marker to the S-eNB.

Upon receipt of Modify Bearer Response from the S-GW, the MME transmits UE Context Release Command to the S-eNB. Upon receipt of this command, the S-eNB releases the resources and information for the UE that has transmitted Measurement Report. Then, the S-eNB returns UE Context Release Complete to the MME.

A handover is completed by performing the sequence mentioned above. Thereafter, the UE communicates via the T-eNB.

Figure 11:
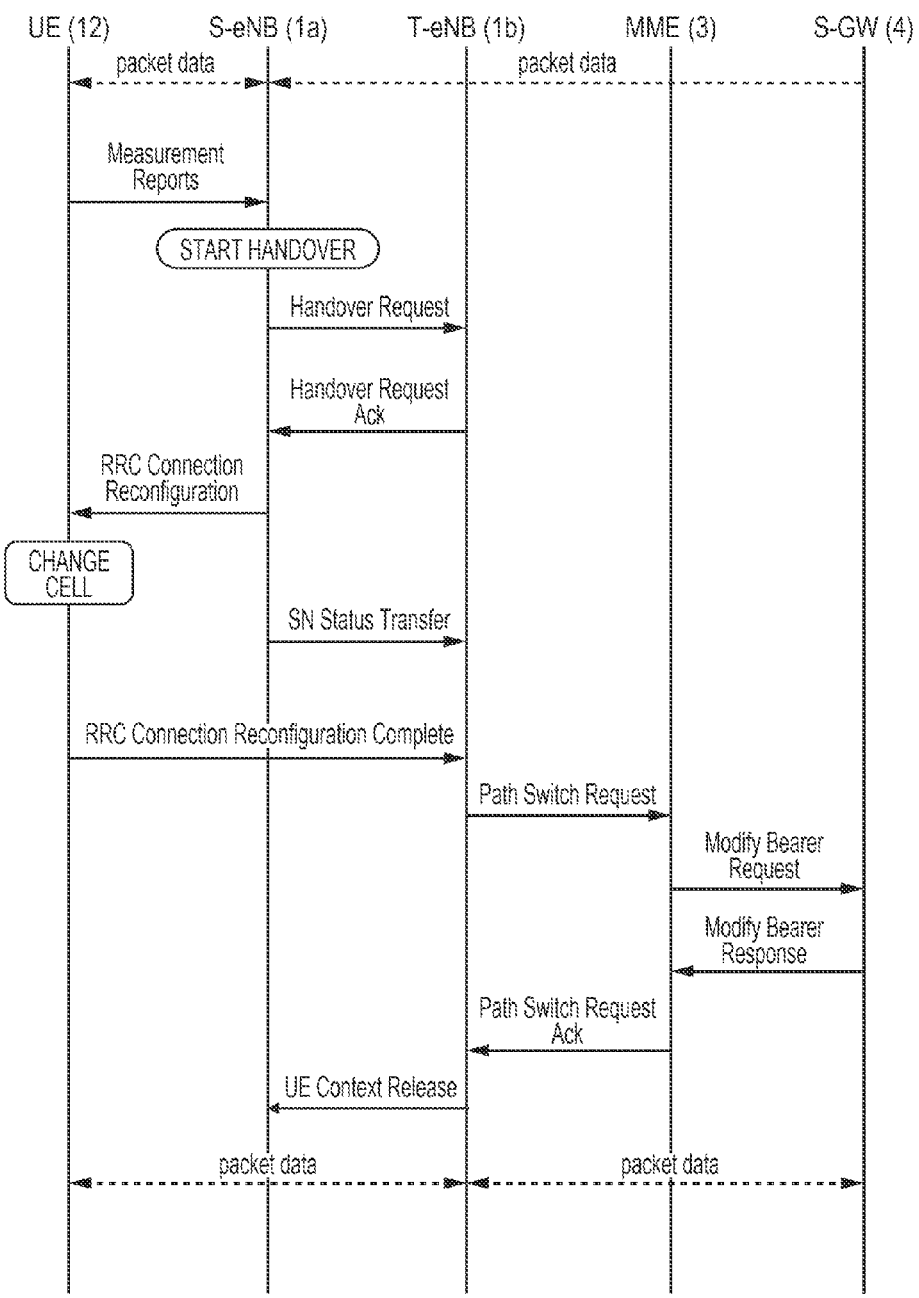
FIG. 11 is a diagram illustrating an example of a handover sequence.

FIG. 11 is a diagram illustrating another example of a handover sequence. The handover illustrated in FIG. 11 is an X2 handover in an LTE network.

In the X2 handover, upon receipt of Measurement Report from the UE, the S-eNB transmits Handover Request to the T-eNB. This Handover Request is an example of a signal requesting a handover from the base station having a coverage area within which a user equipment is located (that is, the S-eNB) to the base station to which the user equipment is to be moved (that is, the T-eNB). Then, the T-eNB returns Handover Request Ack to the S-eNB.

The S-eNB transmits RRC Connection Reconfiguration to the UE. Thereby, the UE changes the base station for connection.

The S-eNB transmits SN Status Transfer to the T-eNB. Also, the UE transmits RRC Connection Reconfiguration Complete to the T-eNB. From this, the T-eNB recognizes that a change from the S-eNB to the T-eNB has been completed in the UE. Then, the T-eNB transmits Path Switch Request to the MME.

Upon receipt of Path Switch Request, the MME transmits Modify Bearer Request to the S-GW. Then, the S-GW returns Modify Bearer Response to the MME. The MME returns Path Switch Request Ack to the T-eNB. The MME transmits UE Context Release Command to the S-eNB. Then, the S-eNB releases the resources and information for the UE that has transmitted Measurement Report. A handover is completed by performing the sequence mentioned above. Thereafter, the UE communicates via the T-eNB.

In this way, the base stations (S-eNB and T-eNB) of the embodiment operate so as to implement a known handover sequence. Additionally, the base station may dynamically change the algorithm for determining a PDCCH format in this handover sequence. For example, the S-eNB dynamically changes the algorithm for determining a PDCCH format from the first algorithm to the second algorithm upon receipt of Measurement Report from the UE. Also, the T-eNB dynamically changes the algorithm for determining a PDCCH format from the first algorithm to the second algorithm upon receipt of Handover Request from the S-eNB or MME.

Note that although FIG. 10 and FIG. 11 illustrate handovers between base stations, a handover may also be performed within a base station. For example, a handover is performed when one base station provides a plurality of sectors and the user equipment moves from one sector to another among the plurality of sectors. In the case where a handover is performed within a base station, the base station changes the algorithm for determining a PDCCH format from the first algorithm to the second algorithm upon receipt of Measurement Report from the UE.

Figure 12:
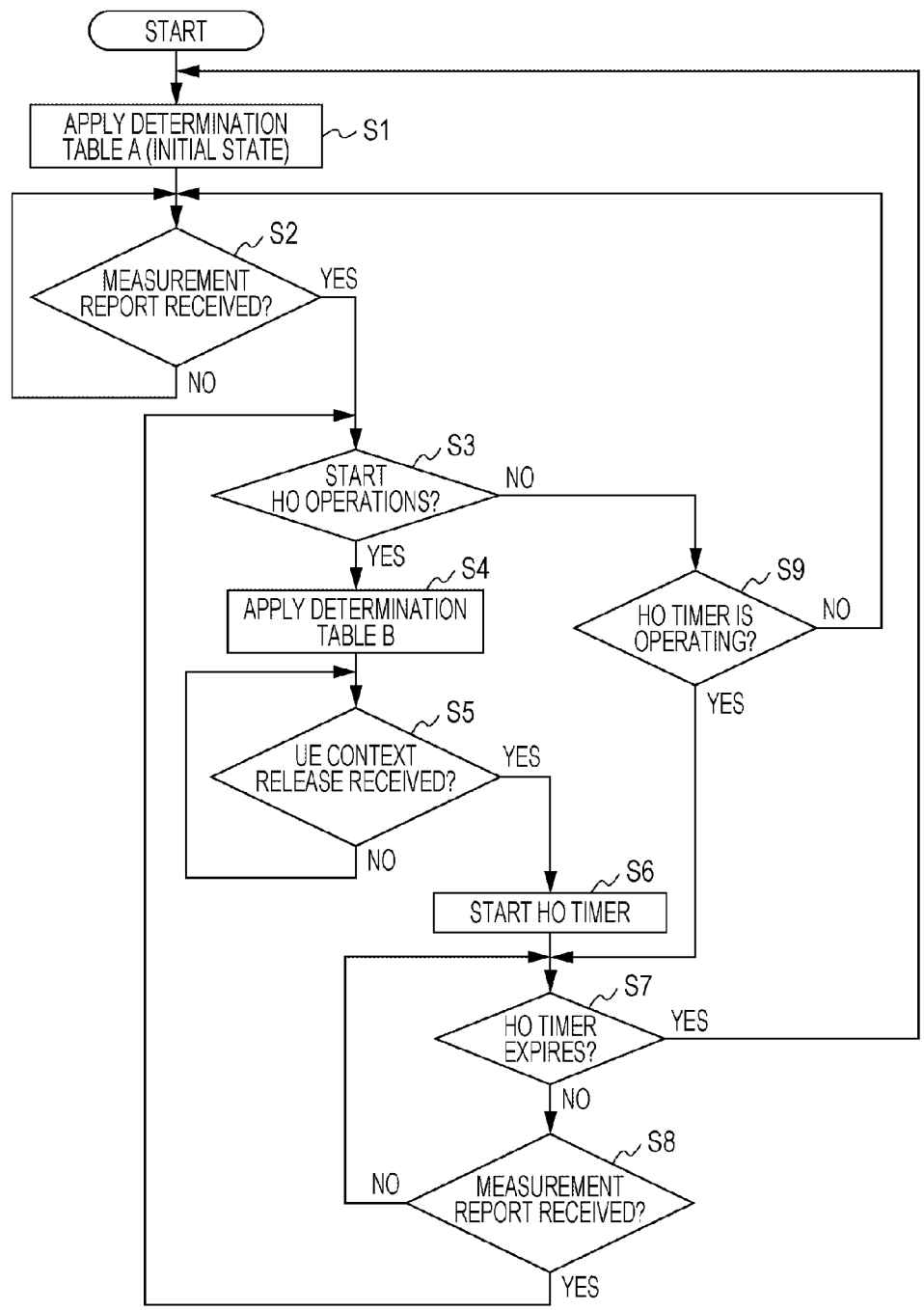
FIG. 12 is diagram illustrating an example of an operational flowchart for a base station, according to an embodiment.

FIG. 12 is diagram illustrating an example of an operational flowchart for a base station, according to an embodiment. The process of the flowchart is performed in the serving base station. That is, it is assumed that when the process of the flowchart starts, the base station has a coverage area within which the user equipment is located. The process of the flowchart is performed for each user equipment located in the coverage area of the base station.

In S1, the format determining unit 45 applies format determination table A to the algorithm for determination of a PDCCH format to be used. Format determination table A stores the correspondences between the conditional expressions for CQIs and the PDCCH formats as illustrated in FIG. 5A. Thereafter, the format determining unit 45 determines the PDCCH format corresponding to a CQI by using the first algorithm that refers to format determination table A.

In S2, the handover controller 61 awaits Measurement Report. When the handover controller 61 receives Measurement Report, then, in S3, the handover controller 61 determines whether to start handover operations. Note that Measurement Report is transmitted from the user equipment 12. Also, the handover controller 61 determines whether to start handover operations, based on the content of Measurement Report.

When the handover controller 61 starts handover operations, then, in S4, the format determining unit 45 applies format determination table B to the algorithm for determining a PDCCH format. Format determination table B also stores the correspondences between the conditional expressions for CQIs and the PDCCH formats as illustrated in FIG. 5B. However, format determination table A and format determination table B differ from each other in the thresholds for determining a PDCCH format corresponding to the CQI. Thereafter, the format determining unit 45 determines the PDCCH format corresponding to a CQI by using the second algorithm that refers to format determination table B.

In S5, the handover controller 61 awaits UE Context Release. This message is transmitted from the mobility management entity (MME) in the sequence illustrated in FIG. 10, and is transmitted from the target base station (T-eNB) in the sequence illustrated in FIG. 11. When the handover controller 61 receives Context Release, then the process of the base station proceeds to S6.

In S6, the format determining unit 45 starts a handover timer. A handover timer measures a period of α. The period of α is, but not particularly limited to, several seconds, for example.

In S7, the format determining unit 45 awaits expiration of the handover timer. In S8, the handover controller 61 awaits Measurement Report. Here, operations of S7 and S8 are performed in parallel. Then, when the handover controller 61 receives Measurement Report before the handover timer expires, the process of the base station proceeds to S3. Otherwise, when the handover timer expires, the process of the base station proceeds to S1. When operation of S1 has been performed, the table appropriate for the algorithm for determining a PDCCH format is changed from format determination table B to format determination table A. That is, when the period of α has elapsed after completion of the handover, the algorithm for determining a PDCCH format returns to the initial state.

Note that when it is determined in S3 that handover operations will not be started, then, in S9, the format determining unit 45 determines whether the handover timer is operating. When the handover timer is operating, the process of the base station proceeds to S7. When the handover timer is not operating, the process of the base station proceeds to S2.

In this way, in the serving base station, the receipt of Measurement Report triggers the algorithm for determining a PDCCH format to be changed from the first algorithm to the second algorithm. Thereby, a PDCCH format that uses many resources is likely to be obtained during a period when a handover is performed. As a result, even during a period when a handover is performed, transmission errors of control signals are constrained, and thus the continuity of communication improves.

In other words, a PDCCH format that uses a few resources is likely to be obtained during a period when a handover is not performed. Therefore, in a wireless communication system, the radio resources for the PDCCH is used efficiently.

Figure 13:
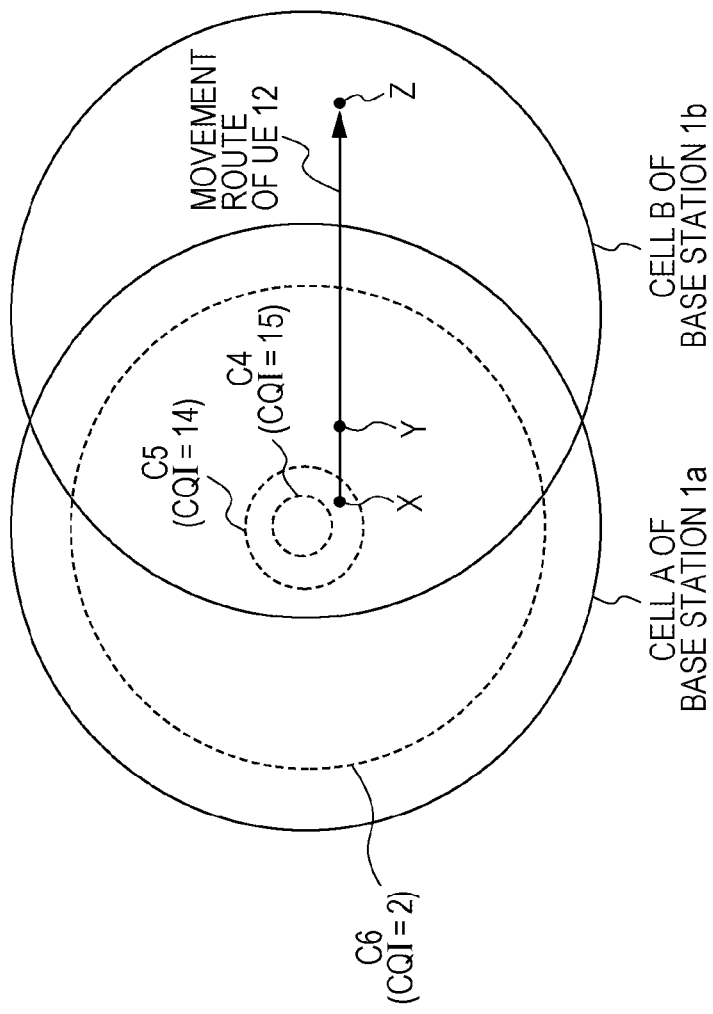
FIG. 13 is a diagram illustrating an example of operations at the time of a handover, according to an embodiment.

FIG. 13 is a diagram illustrating an example of operations at the time of a handover, according to an embodiment. In FIG. 13, three broken-line circles C4, C5, and C6 indicate locations where "CQI=15", "CQI=14", and "CQI=2" are obtained, respectively. Also, the format determining unit 45 determines the PDCCH format using the table illustrated in FIG. 5B (that is, format determination table B) when a handover is performed (that is, the period from S3 to S7 of FIG. 12).

Hereinafter, with reference to FIG. 9 and FIG. 13, a method of determining a PDCCH format based on the CQI will be described. In FIG. 9 and FIG. 13, it is assumed that the user equipment 12 moves from point X through point Y to point X. At point Y, an m handover is performed.

FIG. 9 illustrates operations of the base station 1a when the base station 1a determines a PDCCH format by using the first algorithm that refers to the table illustrated in FIG. 5A. In contrast to this, FIG. 13 illustrates operations of the base station 1a when the base station 1a determines a PDCCH format by using the second algorithm that refers to the table illustrated in FIG. 5B. That is, FIG. 9 illustrates operations performed when a handover of the user equipment 12 is not performed, and FIG. 13 illustrates operations performed when the handover of the user equipment 12 is performed.

When the user equipment 12 is located at point X, the base station 1a determines a PDCCH format corresponding to the user equipment 12 using CQIs denoted by C1 to C3, which are illustrated in FIG. 9, as the thresholds. Here, when the user equipment 12 is located at point X, the CQI obtained by the user equipment 12 is larger than "6" as illustrated in FIG. 9. Therefore, the format determining unit 45 selects PDCCH format #0 with reference to the table illustrated in FIG. 5A.

When the user equipment 12 passes through point Y, the user equipment 12 issues Measurement Report. Then, the base station 1a starts handover operations to proceed to a mode in which the PDCCH format is determined by using the second algorithm. That is, the base station 1a determines a PDCCH format corresponding to the user equipment 12 using CQIs denoted by C4 to C6, which are illustrated in FIG. 13, as the thresholds. Here, in FIG. 13, point Y is located outside of C5 and inside of C6. That is, when the user equipment 12 passes through point Y, "2<CQI<14" is obtained by the user equipment 12. Therefore, the format determining unit 45 selects PDCCH format #2 with reference to the table illustrated in FIG. 5B.

Here, in the case where the PDCCH format is determined using only the table illustrated in FIG. 5A, "format #0" is selected when the user equipment 12 passes through point Y. In contrast to this, the base station of the embodiment determines the PDCCH format using the table illustrated in FIG. 5B when the user equipment 12 passes through point Y. In the example illustrated in FIG. 13, "format #2" is selected when the user equipment 12 passes through point Y. That is, according to the method of the embodiment, a PDCCH format that uses many resources is likely to be obtained when a handover is performed. As a result, even during a period when a handover is performed, transmission errors of control signals are constrained, and thus the continuity of communication improves.

Figure 14:
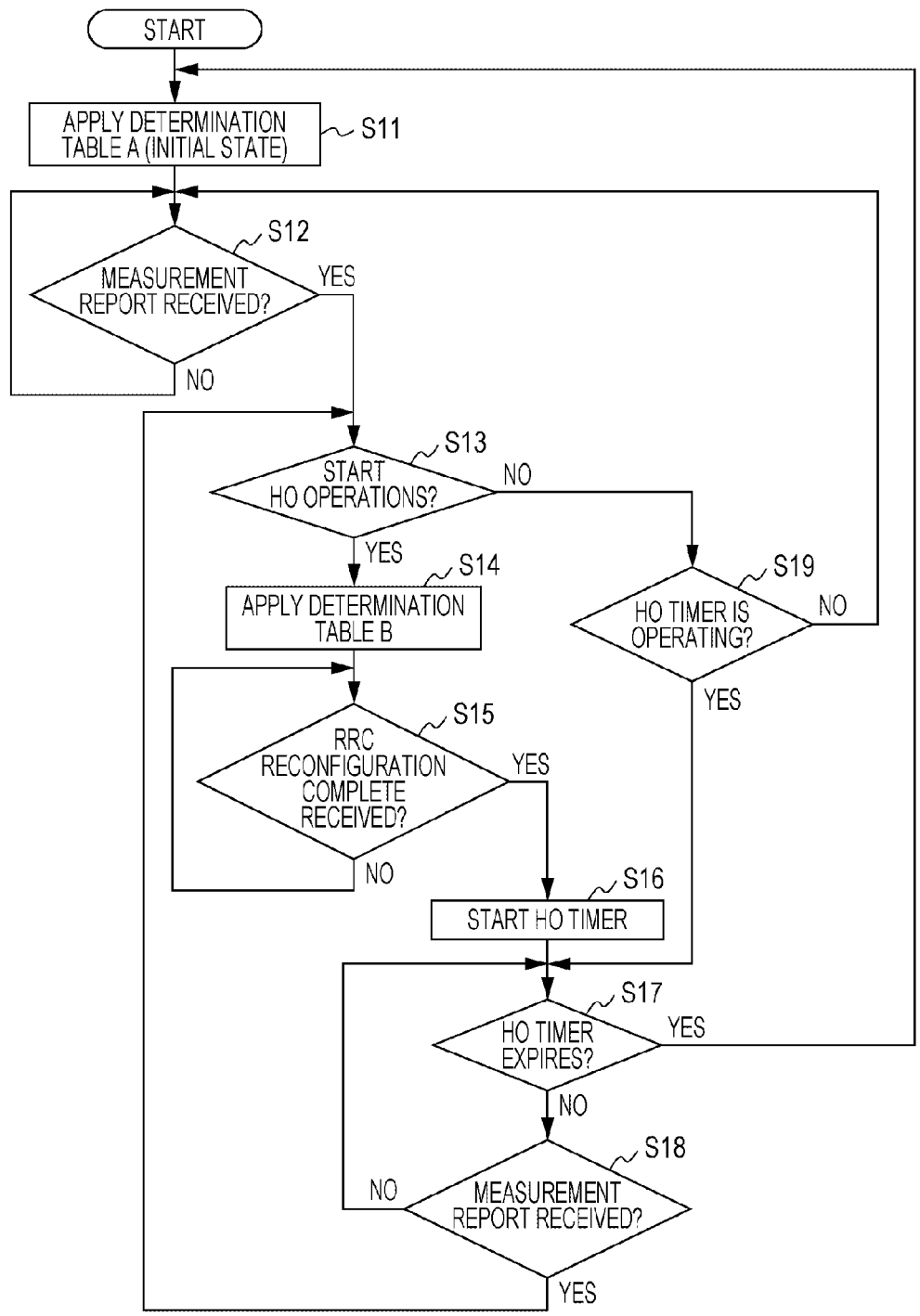
FIG. 14 is diagram illustrating an example of an operational flowchart for a base station, according to an embodiment.

FIG. 14 is diagram illustrating an example of an operational flowchart for a base station, according to an embodiment. The process of the flowchart illustrated in FIG. 14 is performed in the serving base station as in FIG. 12. However, the flowchart of FIG. 14 illustrates the process when a handover is performed between the sectors in the base station.

Operations of S11 to S19 correspond to operations of S1 to S9 illustrated in FIG. 12. However, when a handover is performed between sectors in the base station, the handover controller 61 awaits RRC Reconfiguration Complete in S15. That is, when a handover is performed in the base station, the handover controller 61 recognizes that handover operations have been completed when receiving RRC Reconfiguration Complete. When the handover controller 61 receives RRC Reconfiguration Complete, then the format determining unit 45 starts a handover timer. Note that operations of S11 to S14 and operations S16 to S19 are substantially the same as those of S1 to S4 and S6 to S9 illustrated in FIG. 12.

Figure 15:
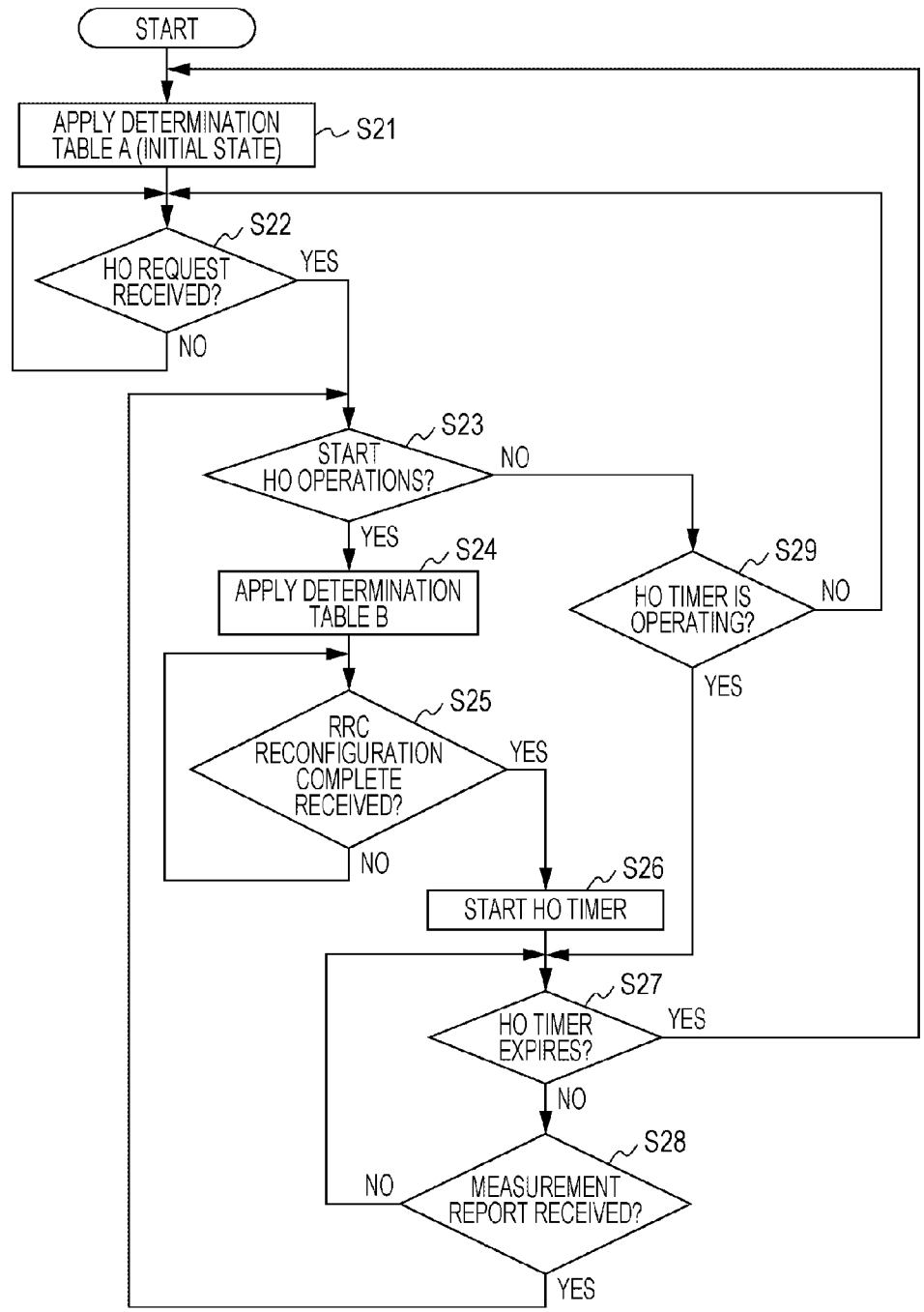
FIG. 15 is a diagram illustrating an example of an operational flowchart for a base station, according to an embodiment.

FIG. 15 is a diagram illustrating an example of an operational flowchart for a base station, according to an embodiment. The process of this flowchart is performed in the target base station. The process of this flowchart is performed for a user equipment that makes an enter into the cell of the base station that performs the process of this flowchart.

The handover controller 61 of the target base station awaits Handover Request in S22. This Handover Request is transmitted from the mobility management entity (MME) in the sequence illustrated in FIG. 10, and is transmitted from the serving base station (S-eNB) in the sequence illustrated in FIG. 11. Upon receipt of Handover Request, the handover controller 61 starts handover operations. In S25, the handover controller 61 awaits RRC Reconfiguration Complete. When the handover controller 61 receives RRC Reconfiguration Complete, the format determining unit 45 starts a handover timer. Operations of S21, S23, S24, and S26 to S29 are substantially the same as those of S1, S3, S4, and S6 to S9 illustrated in FIG. 12.

Note that, in the target base station, the process of the flowchart illustrated in FIG. 15 is performed when the user equipment makes an enter into the cell, for example. Accordingly, the flowchart of FIG. 15 is sometimes started from S22.

In this way, in the wireless communication system of the embodiment, the algorithm for determining a PDCCH format is changed at the time of a handover not only in the serving base station but also in the target base station. Therefore, the transmission errors of PDCCH control signals are further constrained, and thus the continuity of communication further improves.

Note that the base station of the embodiment determines the PDCCH format for a plurality of user equipments located in the cell. Accordingly, the format determining unit 45 determines which of the first algorithm and the second algorithm is to be applied for each of a plurality of user equipments by performing the process of the flowchart illustrated in FIG. 12, FIG. 14, or FIG. 15 for each user equipment. This determination result is managed using the algorithm management table illustrated in FIG. 16A. At this time, "algorithm=2" is temporarily set for a user equipment for which handover operations are being performed, and "algorithm=1" is set for other user equipments. In the example illustrated in FIG. 16A, handover operations for the user equipment UE3 are performed, and "algorithm=2" is recorded for the user equipment UE3.

Also, the base station of the embodiment manages communication quality for a plurality of user equipments located in the cell. Communication quality is measured in each user equipment, and is indicated by a CQI. The base station manages the CQI measured in each user equipment utilizing the quality management table illustrated in FIG. 16B. Note that the latest CQI notified from each user equipment is recorded in the quality management table.

Figure 17:
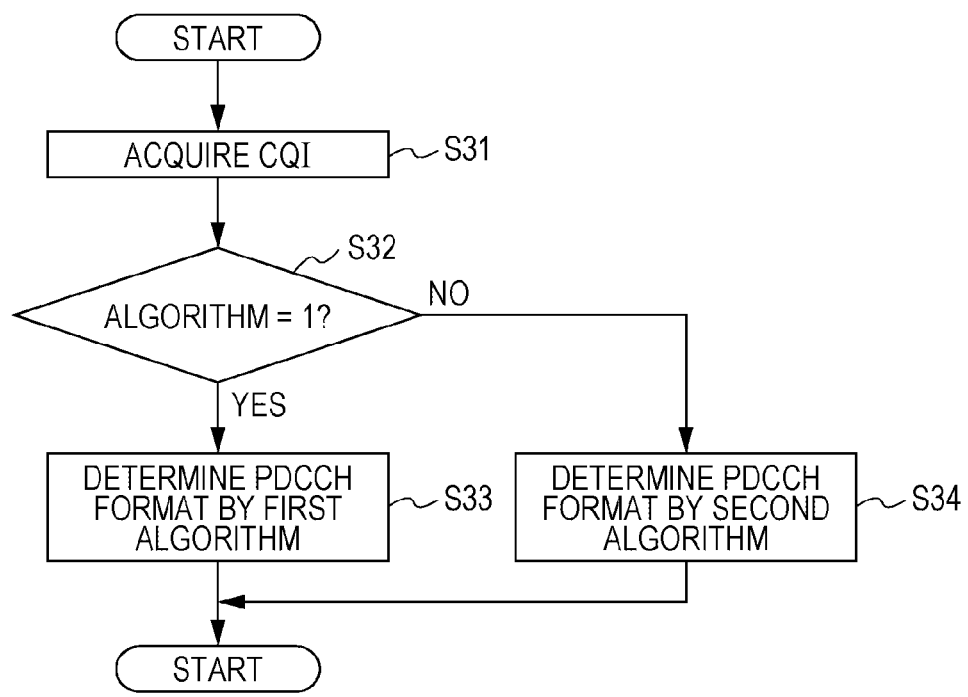
FIG. 17 is a diagram illustrating an example of an operational flowchart for determining a PDCCH format, according to an embodiment.

FIG. 17 is a diagram illustrating an example of an operational flowchart for determining a PDCCH format, according to an embodiment. The process of this flowchart is performed for each user equipment by the format determining unit 45.

In S31, the format determining unit 45 acquires the CQI of a user equipment for which the process is being performed (hereinafter referred to as the "target user equipment"), referring to the quality management table illustrated in FIG. 16B. In S32, the format determining unit 45 determines the algorithm applied to the target user equipment, referring to the algorithm management table illustrated in FIG. 16A.

When "algorithm=1" is set for the target user equipment, then, in S33, the format determining unit 45 determines the PDCCH format corresponding to the target user equipment by using the first algorithm that uses the table illustrated in FIG. 5A. That is, the format determining unit 45 selects the corresponding format by comparing the CQI obtained by the user equipment 12 with three thresholds "6", "4", and "2" illustrated in FIG. 5A. Otherwise, when "algorithm=2" is set for the target user equipment, then, in S34, the format determining unit 45 determines the PDCCH format corresponding to the target user equipment by using the second algorithm that uses the table illustrated in FIG. 5B. That is, the format determining unit 45 selects the corresponding format by comparing the CQI obtained by the user equipment 12 with three thresholds "15", "14", and "2" illustrated in FIG. 5B.

Another Embodiment

In the foregoing embodiment, when a base station receives a signal requesting a handover, the algorithm for determining a PDCCH format is changed. In contrast to this, in an embodiment described hereinafter, a base station monitors the handover success rate, and changes the algorithm for determining the PDCCH format when the success rate becomes lower than a given threshold.

In the serving base station, the handover controller 61 monitors the handover success rate. At this time, the handover controller 61 determines that the handover is successfully completed, when receiving UE Context Release. Accordingly, in the handover sequence illustrated in FIG. 10, for example, the handover controller 61 may calculate the handover success rate based on the ratio of the number of messages of Handover Required transmitted to the mobility management entity (MME) to the number of messages of UE Context Release received from the MME. Also, in the handover sequence illustrated in FIG. 11, the handover controller 61 may calculate the handover success rate based on the ratio of the number of messages of Handover Request transmitted to the target base station to the number of messages of UE Context Release received from the target base station. Then, data indicating the handover success rate is recorded in the statistical information management unit 44.

When the handover success rate is high, the transmission error rate of control signals transmitted using the PDCCH during a handover is considered to be sufficiently low. In contrast to this, when the handover success rate is low, there is a possibility that the transmission error rate of control signals transmitted using the PDCCH during a handover is degraded. Accordingly, it is preferable that the base station transmits a control signal in a PDCCH format that uses many resources, when the success rate of a handover is low.

Accordingly, the format determining unit 45 determines the format of a PDCCH channel by using the first algorithm when the handover success rate is higher than a given threshold. In contrast to this, when the handover success rate is equal to or less than the given threshold, the format determining unit 45 determines the format of a PDCCH channel by using the second algorithm. Thereby, when the handover success rate is low, the PDCCH format in which many resources are used is likely to be selected, and thus the transmission error rate of control signals transmitted using the PDCCH improves.

Note that, in this embodiment, the base station may prepare three or more algorithms. In this case, when the handover success rate does not improve even when the format of a PDCCH channel is determined by the second algorithm, the base station determines the format of a PDCCH channel by using the third algorithm. In the third algorithm, it is assumed that the PDCCH format that uses many resources is more likely to be selected than in the first and second algorithms.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
   a handover controller configured to control a handover of a user equipment; and
   a format determining unit configured to:
   select a first algorithm, when the user equipment is not in a handover state, the first algorithm comprising an allocation of communication resources based on a first set of channel quality standards;

select a second algorithm, when the user equipment is in the handover state, the second algorithm comprising an allocation of communication resources based on a second set of channel quality standards which correspond respectively to the first set of channel quality standards such that at least one standard in the second set of channel quality standards is higher than each standard in the first set of channel quality standards; and determine a format of a communication channel with the user equipment based on the first algorithm or the second algorithm, wherein the second algorithm causes the format determining unit to determine a format that uses more communication resources for a same communication quality than the first algorithm;

when executing the first algorithm, the format determining unit selects a first format when a quality of communication with the user equipment is equal to or larger than a first threshold, and selects a second format that uses more resources than the first format when the quality of communication with the user equipment is less than the first threshold; and when executing the second algorithm, the format determining unit selects the first format when the quality of communication with the user equipment is equal to or larger than a second threshold that is greater than the first threshold, and selects the second format when the quality of communication with the user equipment is less than the second threshold.

2. The base station of claim 1, wherein the format determining unit determines the format of the communication channel by using the first algorithm when a handover operation of the user equipment is not performed, and determines the format of the communication channel by using the second algorithm when the handover operation of the user equipment is performed.

3. The base station of claim 2, wherein, upon receiving a signal requesting a handover from the user equipment, the format determining unit determines the format of the communication channel by using the second algorithm.

4. The base station of claim 2, wherein, upon receiving a signal requesting a handover of the user equipment from another base station having a coverage area within which the user equipment is located, the format determining unit determines the format of the communication channel by using the second algorithm.

5. The base station of claim 2, wherein, upon receiving a signal requesting a handover of the user equipment from a mobility management entity configured to manage movement of the user equipment, the format determining unit determines the format of the communication channel by using the second algorithm.

6. The base station of claim 1, wherein the handover controller detects a handover success rate in the base station; and the format determining unit determines the format of the communication channel by using the first algorithm when the handover success rate is larger than a given threshold, and determines the format of the communication channel by using the second algorithm when the handover success rate is equal to or less than the given threshold.

7. A wireless communication method comprising:

selecting, by a base station, a first algorithm, when a user equipment is not in a handover state, the first algorithm comprising an allocation of communication resources based on a first set of channel quality standards;

selecting, by the base station, a second algorithm, when the user equipment is in the handover state, the second algorithm comprising an allocation of communication resources based on a second set of channel quality standards which correspond respectively to the first set of channel quality standards such that at least one standard in the second set of channel quality standards is higher than each standard in the first set of channel quality standards; and determining, by the base station, a format of a communication channel with the user equipment based on the first algorithm or the second algorithm, wherein the second algorithm causes the base station to determine a format that uses more communication resources for a same communication quality than the first algorithm;

when executing the first algorithm, the base station selects a first format when a quality of communication with the user equipment is equal to or larger than a first threshold, and selects a second format that uses more resources than the first format when the quality of communication with the user equipment is less than the first threshold; and when executing the second algorithm, the base station selects the first format when the quality of communication with the user equipment is equal to or larger than a second threshold that is greater than the first threshold, and selects the second format when the quality of communication with the user equipment is less than the second threshold.

* * * * *